United States Patent Office 2,931,709
Patented Apr. 5, 1960

2,931,709

DECARBURIZING SILICON TETRACHLORIDE

Robert S. Aries, New York, N.Y.

No Drawing. Application September 17, 1956
Serial No. 610,376

4 Claims. (Cl. 23—205)

The present invention relates to a novel process for the purification of silicon tetrahalides such as silicon tetrachloride. More particularly, it relates to a purification technique for silicon tetrachloride which permits the formation of elemental silicon in high yield and purity.

Several methods have been proposed for the preparation of highly purified silicon for use in semiconductor devices. In one such method, silicon tetrachloride is reduced by zinc vapor to yield silicon. This silicon is further purified by zone-refining techniques in which a molten zone is made to traverse a length of silicon in the form of a bar, the impurities being segregated to one end of the bar. While such methods result in the production of high purity silicon, it has been found that trace impurities still remain in the finished silicon. One such contaminating trace material is carbon, either in the free form, or, more commonly, as carbon tetrachloride or as an organic carbon compound. This carbon impurity is apparently introduced during the formation of the silicon tetrachloride which is ordinarily effected by the chlorination of silicon carbide. Even though the silicon tetrachloride is ordinarily subjected to redistillation this does not serve to remove the carbon impurities and they are carried through to the silicon.

While the presence of carbon in elemental silicon has been noted, the disadvantages attending the presence of the carbon have not been appreciated. I have found that the carbon contaminants form a nucleus for other impurities and the ultimate silicon crystals are deleteriously affected. Specifically, the carbon hinders the growth of the silicon crystals during further processing and thus a large amount of small silicon crystals is obtained together with many fines which are insufficiently pure for semiconducting purposes.

It is accordingly an object of the present invention to provide elemental silicon substantially free from carbon containing impurities.

It is a further object of the invention to remove the carbon from silicon tetrahalides so that no carbon will be present during the formation and crystallization of silicon.

Another object of the invention is to remove from silicon tetrachloride the carbon impurities together with certain other impurities from groups III and V of the periodic table, such as boron and phosphorus.

These and other objects and advantages are realized in accordance with the present invention wherein silicon tetrahalide is passed over a metal or mixture of metals having an affinity for chlorine, the metal having a high ratio of surface to volume. The contact is effected with the silicon tetrachloride in vapor state and with the metal maintained at an elevated temperature below that at which the tetrachloride will be thermally decomposed.

The large surface of the metal can be achieved through use of porous or spongy metals or through subdivision of the metals. While aluminum, sodium, and other metals having an affinity for chlorine can be employed, the preferred metal is mossy zinc which is a porous mass produced by pouring the molten metal into water.

While the exact mechanism of the decarburizing is not certain, it is believed that the metal dehalogenates the impurities selectively and the carbon, resulting from carbon tetrachloride for example, deposits on the surface of the metal. The halides of elements of groups III and V of the periodic table are similarly decomposed so that the process simultaneously serves to remove these contaminants. The temperature is below the melting point of the metal employed and is such that the silicon tetrahalide is not affected.

The temperatures can be varied in dependence upon the melting points of the metals employed. With the preferred metal zinc the temperature can range from about 150° C. to 415° C. although temperatures in excess of 275° C. are preferred. A preferred range is 320° C. to 385° C.

The equipment for effecting the instant purification should be such as will not introduce further impurities and fused silica quartz equipment has proven suitable.

In practicing a preferred embodiment of this invention, mossy zinc of C.P. grade or better is maintained in a heated vitreous silica column, of low boron content, at a temperature below its melting point. Silicon tetrachloride is introduced at the bottom of the column, where it is rapidly volatilized, and the vapor of silicon tetrachloride passes over the surface of the mossy zinc which exerts a scrubbing action thereon. Carbon compounds present are readily decomposed and are deposited in the form of fine carbon particles on the surface and in the interstices of the zinc. When the zinc becomes poisoned, it is replaced.

A specific illustrative embodiment of the invention will now be described:

*Example*

(a) A fused quartz silica column 6 inches in diameter is packed with C.P. grade mossy zinc to a height of 18 inches. Silicon tetrachloride is vaporized and passed into one end of the column at the rate of 10 pounds per hour, the zinc being maintained at a temperature of 370° C. The purified silicon tetrachloride is withdrawn from the other end of the column. In a first run, the withdrawn purified silicon tetrachloride is passed through a condenser and liquefied for further use.

(b) In a second run, the effluent gas from the column is heated and reduced to elemental silicon as described in Transactions of the Electrochemical Society, vol. 96 (1949) pages 359–363. The silicon crystals thus obtained exhibit a resistivity in excess of 100 ohm centimeters. In addition, the silicon crystals, as compared with those from silicon tetrachloride which has not been purified with the zinc, are larger in size and a smaller proportion of impure fines is obtained.

Other silicon tetrahalides such as the bromide can be similarly purified. The novel process can be combined with other purification techniques performed either previously or subsequently.

Whereas purification of the silicon in an attempt to purge the impurities is costly due to loss of a proportion of the expensive silicon, the present process operates on the inexpensive halide starting material and costly treatments of the end product can be dispensed with.

Various changes and modifications may be made without departing from the spirit and scope of the present invention and it is intended that such obvious changes and modifications be considered within the purview of the annexed claims.

What is claimed is:

1. The process for removing traces of carbon, boron, phosphorus and their compounds from silicon tetrahalides which comprises contacting gaseous silicon tetrahalide with a metal having a large ratio of surface to volume and selected from the group consisting of aluminum, sodium and zinc at an elevated temperature below the decomposition temperature of the silicon tetrahalide.

2. The process for removing traces of carbon, boron, phosphorus and their compounds from silicon tetrachloride which comprises passing gaseous silicon tetrachloride over a porous metal selected from the group consisting of aluminum, sodium and zinc at a temperature below the decomposition temperature of the silicon tetrachloride and below the melting point of the metal.

3. The process defined in claim 2, wherein the metal comprises mossy zinc and the temperature ranges between about 150° C. and 415° C.

4. The process for removing traces of carbon, boron and phosphorus and their compounds from silicon tetrachloride, which comprises passing gaseous silicon tetrachloride through a column of mossy zinc at a temperature ranging between about 320° C. and 385° C.

References Cited in the file of this patent

UNITED STATES PATENTS

| 1,241,796 | Weaver | Oct. 2, 1917 |
| 1,725,429 | Schaack | Aug. 20, 1929 |
| 2,172,969 | Eringer | Sept. 12, 1939 |
| 2,725,350 | Levy | Nov. 29, 1955 |

FOREIGN PATENTS

| 627,904 | Great Britain | Aug. 18, 1949 |
| 656,098 | Great Britain | Aug. 15, 1951 |
| 716,681 | Great Britain | Oct. 13, 1954 |
| 745,698 | Great Britain | Feb. 29, 1956 |

OTHER REFERENCES

Chemical Abs., vol. 48, p. 14139.